(12) United States Patent
Coquard et al.

(10) Patent No.: US 7,273,235 B2
(45) Date of Patent: Sep. 25, 2007

(54) TOOTHED WASHER FOR A TUBE COUPLER DEVICE, A METHOD OF MAKING A TOOTHED WASHER, AND A COUPLER DEVICE OF THE QUICK COUPLING TYPE

(75) Inventors: Jean-Luc Coquard, La Tour de Scay (FR); Philippe Le Quere, Betton (FR); Olivier Bogard, Rennes (FR)

(73) Assignee: Legris SA, Rennes (FR)

( * ) Notice: Subject to any disclaimer, the term of this patent is extended or adjusted under 35 U.S.C. 154(b) by 270 days.

(21) Appl. No.: 11/047,734

(22) Filed: Feb. 2, 2005

(65) Prior Publication Data
US 2005/0173922 A1 Aug. 11, 2005

(30) Foreign Application Priority Data
Feb. 5, 2004 (FR) .................................. 04 01100

(51) Int. Cl.
*F16L 37/00* (2006.01)
(52) U.S. Cl. ........................ 285/308; 285/340
(58) Field of Classification Search ................ 285/319, 285/321, 308, 340
See application file for complete search history.

(56) References Cited

U.S. PATENT DOCUMENTS

| 4,084,843 | A | * | 4/1978 | Gassert .................... 285/105 |
|---|---|---|---|---|
| 4,313,331 | A |  | 2/1982 | Mode |
| 4,676,530 | A | * | 6/1987 | Nordgren et al. ............. 285/93 |
| 5,487,572 | A | * | 1/1996 | Combot-Courrau et al. .......................... 285/308 |
| 5,553,901 | A | * | 9/1996 | Serot .......................... 285/340 |
| 5,692,784 | A | * | 12/1997 | Hama et al. ................. 285/308 |
| 5,695,224 | A |  | 12/1997 | Grenier |
| 5,816,627 | A |  | 10/1998 | Readman |
| 5,988,690 | A | * | 11/1999 | Bogard ........................ 285/24 |
| 6,174,002 | B1 | * | 1/2001 | Rho ........................... 285/340 |
| 7,025,392 | B2 | * | 4/2006 | Inoue et al. ................ 285/302 |

FOREIGN PATENT DOCUMENTS

| DE | 20004291 U1 | 9/2000 |
|---|---|---|
| EP | 0197874 A1 | 10/1986 |
| EP | 0550323 A1 | 7/1993 |
| FR | 2829830 A1 | 3/2003 |
| FR | 2835903 A1 | 6/2003 |

* cited by examiner

*Primary Examiner*—David Bochna
(74) *Attorney, Agent, or Firm*—Young & Thompson

(57) ABSTRACT

The invention relates to a washer for a tube coupler device, the washer having an inner portion subdivided into a plurality of teeth with active portions having a free edge that defines an inside edge of the washer and that is arranged to penetrate into an outside surface of the tube, wherein the active portions are arranged so that the inside edge is substantially continuous. The invention also provides a method of making the washer and a coupler device.

3 Claims, 3 Drawing Sheets

TOOTHED WASHER FOR A TUBE COUPLER DEVICE, A METHOD OF MAKING A TOOTHED WASHER, AND A COUPLER DEVICE OF THE QUICK COUPLING TYPE

The present invention relates to a toothed washer for a tube coupler device, to a method of making a toothed washer, and to a coupler device of the quick coupling type.

BACKGROUND OF THE INVENTION

Numerous devices exist that enable a tube to be coupled quickly to an intermediate coupler device, either between the tube and another tube, or between the tube and equipment in an installation (manifold, hydraulic actuator, . . . ), and regardless of whether the device is fitted to or integral with the equipment.

The coupler device includes means for retaining the end of the tube against an extraction force and in leaktight manner in a bore for receiving said end, and after the end has been freely inserted therein. In addition to a sealing gasket, such means generally include a washer with inwardly-directed teeth in which the teeth are raised by flexing while the tube is being inserted and then tend to bite into the tube in order to oppose extraction thereof.

A washer for a tube coupler device generally comprises an outer portion that is designed to be received in a groove formed in the bore of the coupler device and an inner portion subdivided into a plurality of teeth with active portions having free edges that define an inside edge of the washer that is arranged to penetrate into an outside surface of the tube.

Such a washer provides effective retention of the tube in the coupler device and it is made by punching, thereby enabling a wide variety of shapes to be obtained at relatively low cost.

Unfortunately, with such washers it is found that there exists a risk of the tube being extracted in the event of the tube being subjected to a particularly strong extraction force.

OBJECTS AND SUMMARY OF THE INVENTION

An object of the invention is to provide means for improving the tube retention exerted by washers in a tube coupler device.

With known washers, the active portions of the teeth are spaced apart from one another. As a result when an extraction force is applied to the tubes, stresses become concentrated at the interface between the tube and the active portions of the teeth. This leads to a risk of the material constituting the tube being locally torn away or deformed so that the washer can no longer retain the tube properly.

The invention provides a washer for a tube coupler device, the washer having an inner portion subdivided into a plurality of teeth, each possessing a short root portion extending at rest in a radial plane, and an active portion that is inclined relative to the radial plane, with the teeth being connected to one another via peripheral connection portions such that the deformation of said peripheral connection portions that results from the washer as a whole being deformed is greater than the deformation of the teeth. The active portions have respective free edges defining an inside edge of the washer that is arranged to penetrate into an outside surface of the tube, the active portions being arranged so that the inside edge is substantially continuous.

This washer can be used as a blank for final preparation of the washer, or it can be used directly in the coupler device. With such a washer, the teeth have respective active portions with free edges that present the longest possible length, thereby enabling stresses to be distributed better when the teeth bite into a tube that is being subjected to an extraction force.

Preferably, the active portions possess side edges that extend substantially radially.

This makes the washer easier to fabricate.

The invention also provides a method of making a washer for a tube coupler device, the method including a step of forming active portions of teeth in an inner portion of a washer blank, this step being implemented by shearing.

Thus, whereas punching involves removing material, thereby reducing the maximum possible length of the active portions of the teeth, shearing does not result in material being removed, and thus enables said maximum length to be achieved.

According to a particular characteristic, the method includes a step of deforming each active portion to form at least one portion that projects relative to a general plane of the tooth.

This makes it possible to prevent the washer from turning relative to the tube and to prevent the tube being extracted by being unscrewed. Because of the great length of the active portions, the projecting portion can be obtained by deforming the active portion while conserving sufficient length for the active portion to enable it to hold the tube.

The invention also provides a tube coupler device comprising a body having a bore for receiving the end of a tube and means for retaining the tube in the bore, said means being constituted by an elastically-deformable washer comprising an outer portion placed in a groove formed in the bore, the groove having a sloping downstream wall, and an inner portion subdivided into a plurality of teeth, each possessing a short root portion extending at rest in a radial plane, and an active portion inclined relative to the radial plane, which teeth are interconnected by peripheral connection portions such that the deformation of the peripheral connection portions that results from the washer as a whole being deformed is greater than the deformation of the teeth, the device including an abutment for the teeth when an excessive extraction force is applied to the tube, each tooth being capable of rocking about the abutment, the peripheral portion of the washer then coming to bear against the sloping wall of the groove so that after the active portions of the teeth have rocked about the abutment, their side edges are immediately adjacent to one another in pairs.

A washer such as the washer of the invention is deformable practically solely in its portions interconnecting the teeth. After pivoting, the teeth are in a position in which their active portions are practically radial and penetrate maximally into the wall of the tube. If an extraction force continues to be exerted, the active portions then work in bending against the abutment and the tube, opposing a level of resistance to said extraction force that is much greater than the level of resistance that would originally have been opposed. Since the active portions of the teeth are in a radial position, with their side edges being mutually adjacent, the washer is in contact with the tube over practically all of its circumference. Stresses are thus distributed over the entire circumference and resistance to extraction is particularly high.

Preferably, the device includes a tubular pusher mounted to slide in the bore between an inactive extended first position and an active inserted second position in which the teeth of the washer are moved away from their rest position by a nose of the pusher, with the nose of the pusher in its inactive position constituting the abutment for the teeth.

The pusher then performs two functions: in the active position it enables the tube to be disconnected, and in the inactive position it constitutes the pivoting abutment for the teeth of the washer.

BRIEF DESCRIPTION OF THE DRAWINGS

Other characteristics and advantages of the invention appear from the description given below of an embodiment.

Reference is made to the accompanying drawings, in which.

MORE DETAILED DESCRIPTION

Figure 7:
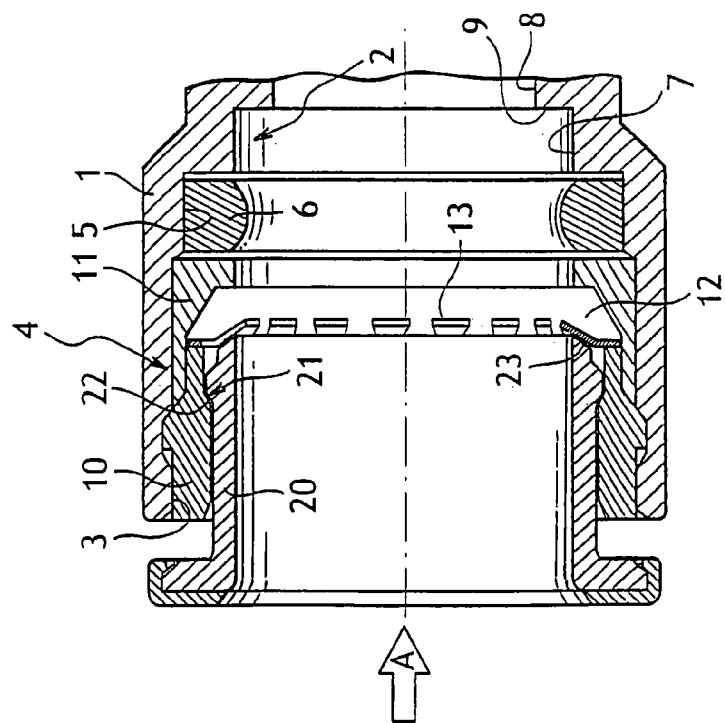
FIG. 7 is a diagram in section of an embodiment of a coupling of the invention with a pusher for decoupling the tube.

FIG. 7 is a section view of a tube coupler device comprising a body 1 which is provided with a bore 2 that is axially subdivided into four portions, namely, from left to right: a large diameter portion 3 for receiving an insert 4; a smaller diameter portion 5 for receiving an O-ring 6; a portion 7 of diameter corresponding substantially to the outside diameter of the tube for insertion into the coupling; and a portion 8 of diameter substantially equal to the inside diameter of the tube. Between the portions 7 and 8, a shoulder 9 constitutes an abutment against the tube being pushed into the coupling. In a particular embodiment, the portion 7 of the bore may be slightly conical, tapering towards the portion 8 so as to establish a small amount of compression against the wall of the tube as it penetrates into said portion 7.

The insert 4 is shown here as being made of two portions 10 and 11 which are forcibly inserted and held in the body 1 in a conventional manner, particularly when the body 1 is made of a plastics material and the inserts are made of metal. The two portions 10 and 11 define between them a groove 12 which constitutes a housing for a washer 13 provided with teeth for catching and retaining the tube that is to be inserted in the bore 2.

Figure 1:
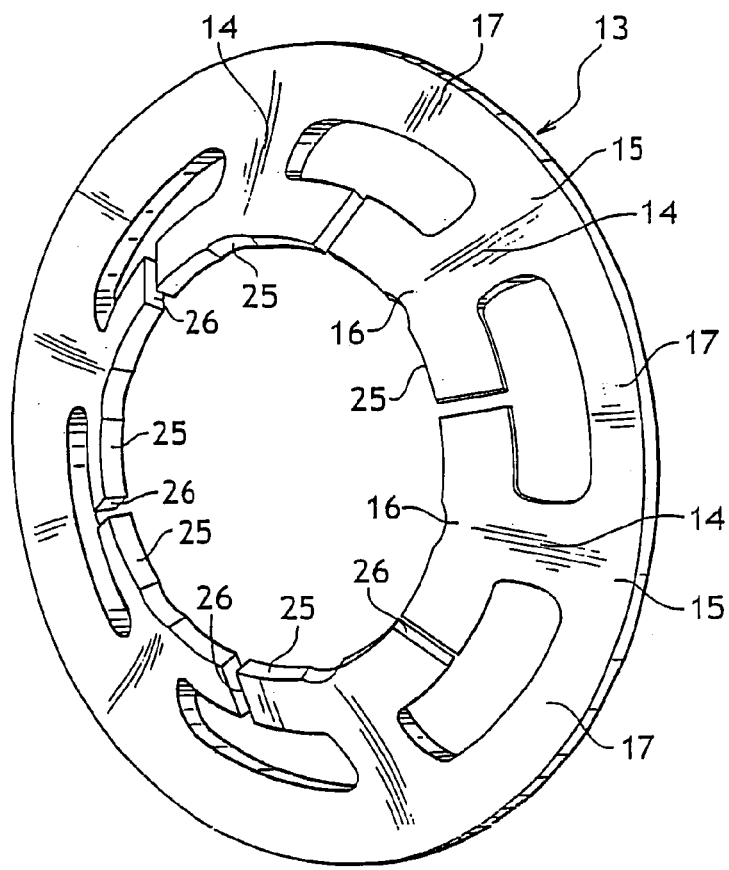
FIG. 1 is a perspective view of a washer in accordance with the invention.

With reference also to FIG. 1, the washer 13 thus comprises a plurality of inwardly-directed teeth 14, in this case implemented in the form of blades, each comprising a root 15 extending, when the washer is at rest, in a substantially radial plane, and an active portion 16 forming an angle, in this case of 25°, with the root 15. The active portion 16 of each tooth is substantially plane or slightly conical.

Each tooth is connected to the adjacent tooth via a peripheral connection portion 17 of small-section, i.e. of width no greater than the width of the root 15. In addition, each connection portion 17 is of a peripheral length (measured in a direction tangential to the washer) that is not less than the length of each tooth (measured along a radius of the washer). The teeth 14 thus have their roots spaced apart from one another sufficiently to ensure that the connection portions 17 are not too rigid and can easily accept twisting deformation. In a preferred embodiment described below by way of non-limiting example, the width of each connection portion 17 is no greater than one-fifth of the total width of the washer or of the length l as defined below.

In contrast, each tooth 14 constitutes a body that is not deformable and that is suitable for pivoting as a unit.

Each active portion 16 has a free edge 25 arranged to bite into the outside surface of the tube, and of a length such that the sum of the lengths of the free edges of all of the teeth 14 co-operating with the tube is sufficiently long for the grip on the tube to be distributed over substantially its entire circumference. The active portions 16 of the teeth 14 have side edges 26 that are immediately adjacent in pairs so that when the washer 13 is deformed to such an extent that the active portions 16 extend in a radial plane, the side edges 26 of the active portions 16 come substantially into contact and define an inside edge for the washer 13 that is substantially continuous.

The coupling also includes a tubular pusher 20 slidably movable in the portion 10 of the insert between an inactive extended position in which it has a shoulder 21 coming into abutment against a shoulder 22 of said portion 10, with the washer 13 then merely pressing against the nose 23 of the pusher 20, and an inserted position in which the shoulders 21 and 22 are spaced apart from each other and the nose 23 lifts all of the active portions 16. This disposition is well known in this type of coupling.

Figure 8:
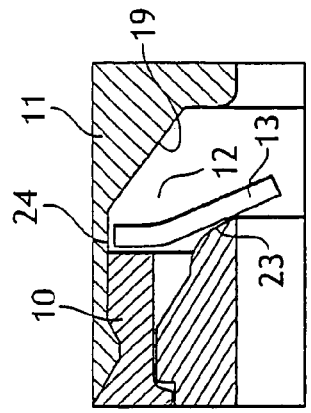
FIG. 8 is a diagram in section showing the state of the coupler device in the absence of a tube.

FIG. 8, which is a section view of a detail, shows the washer 13 in its rest position received in the groove 12 whose bottom 24 is of a width that is greater than the thickness of the washer 13. It should also be observed that the diameter of the groove 12 measured at its bottom 24 is slightly greater than the outside diameter of the washer 13 so that clearance exists between the washer 13 and the groove 12 for reasons that are given below.

While the tube 18 is being inserted into the bore (arrow A from left to right in FIG. 7), the tube has the effect of lifting each of the teeth, which tend to tilt as undeformable bodies about the connecting portions connecting them to the adjacent teeth in the bottom of the groove 12 where the connecting portions are received. The tilting movement of each tooth 14 depends essentially on the difference between the outside diameter of the tube 18 and the inside diameter of the washer 13 when at rest, and in certain embodiments, this angle of tilt may be as great as 40°. To make such tilting possible, the groove 12 possesses a sloping wall 19. The wall 19 is situated downstream relative to the direction in which the tube is inserted, with the bottom of the groove being of a width that is substantially equal to the thickness of the washer 13.

Under such conditions, while the tube is being inserted, all that occurs is tilting of the teeth in an outward direction without the washer moving significantly in translation in the direction in which the tube is being inserted. Once the tube has been put into place, the active portions 16 are tilted relative to the axis of the tube at an angle of about 25°.

Figure 9:
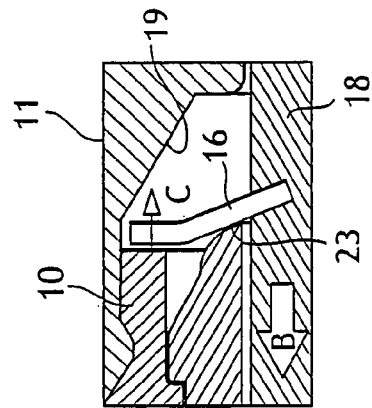
FIGS. 9 and 10 are diagrams showing the behavior of the toothed washer in the FIG. 7 device when an excessive extraction force is applied to the tube.

An extraction force applied to the tube 18 in the direction opposite to its insertion direction (arrow B in FIGS. 9 and 10) increases the force with which each tooth 14 bites into the wall of the tube 18 and tends to cause each tooth 14 to pivot towards the rest position of the washer 13 (see FIG. 9). It should be observed that given the highly tilted position of each tooth 14 relative to the axis of the tube 18, and given its non-flexibility (no buckling), a small withdrawal movement of the tube causes each tooth 14 to penetrate into the tube 18 by an amount that is equal to or even greater than said withdrawal movement. This sharp penetration of each tooth into the tube 18 constitutes highly effective means for preventing the tube being withdrawn.

Figure 10:
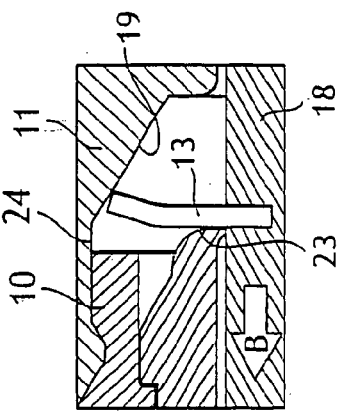

Continued application of the extraction force causes each tooth 14 to come to bear against the nose 23 of the pusher 20 which constitutes a fixed (little deformable) position about which the teeth tend to rock beyond the rest position of the washer, entraining the peripheral portion of the washer to pivot in the direction marked C in FIG. 9. This pivoting is made possible because of the twisting flexibility of the portions 17 interconnecting the teeth at the periphery of the washer. The washer is then observed to snap suddenly from its rest shape to another shape as shown in FIG. 10, in which the active portions 16 occupy a substantially radial plane while the roots 15 are inclined relative to said plane. This snapping of the washer from its FIG. 9 shape to its FIG. 10 shape is made possible by the presence of the clearance mentioned above. It can be seen that in this new shape, the peripheral portion of the washer bears against the sloping wall 19 of the groove 12, and that continued traction on the tube 18 is then impeded by the washer, which can no longer rock on the nose of the pusher, since its peripheral portion is in abutment against the wall 19. The active portion 16 of each tooth 14 is then subjected to a pure bending force of magnitude that is a function of the nature of the material constituting the tube 18.

In FIG. 10, it can be seen that the active portions 16 extend in a plane that is substantially radial, with the side edges 26 of the active portions 16 then being substantially in contact with one another to define an inside edge of the washer 13 that is substantially continuous. This produces optimum distribution of the stresses generated by the extraction force at the interface between the tube and the active portions of the teeth.

It can thus be seen that under normal conditions of force seeking to extract the tube from the coupling, the teeth of the washer work by withstanding buckling.

As soon as such normal conditions are exceeded, the teeth work as radial obstacles to extraction and they are subjected to stresses of a different kind. They can thus present extraction-opposing characteristics that differ depending on whether the force applied to the tube is normal or excessive.

In the embodiment that enables the washer to change state, the necessary presence of clearance to allow the change of state to occur allows the tube into which the washer has bitten to move back a little, but this distance can be limited by providing only just sufficient clearance in the bottom of the groove.

The washer 13 is obtained by a manufacturing method that is described below.

The method comprises a punching step of punching out a plane washer blank, thereby forming the central hole and the openings 27 for separating the connection portions 17 from the active portions 16. The openings 27 are substantially in the form of annular segments in this case.

A shearing step is subsequently performed along radial lines of cut extending between the central hole and the respective openings 27 so as to separate the active portions 16 from one another and so as to form the side edges 26. The side edges 26 then extend radially and each adjacent pair of active portions has side edges 26 that are parallel and facing each other.

The method further includes a stamping step which consists in shaping the washer in such a manner that the root portions occupy a radial plane while the active portions are inclined relative to the root portions. The washer is thus substantially frustoconical in shape.

Naturally, the invention is not limited to the embodiment described but covers any variant coming within the ambit of the invention as defined by the claims.

The invention also applies to any type of washer for a tube coupler device, and in particular to washers in which the teeth work essentially in bending.

A washer that is totally plane and in accordance with the invention can thus be used in a coupler device.

The invention also applies to other types of coupler device, and in particular to those that do not have a disconnection pusher or an abutment against which the teeth can rock (even though the washer of the invention is particularly effective therewith).

The abutment on which the teeth rock may be formed by the end of the portion 10 of the insert 4 that is connected to the portion 11 thereof.

Figure 2:
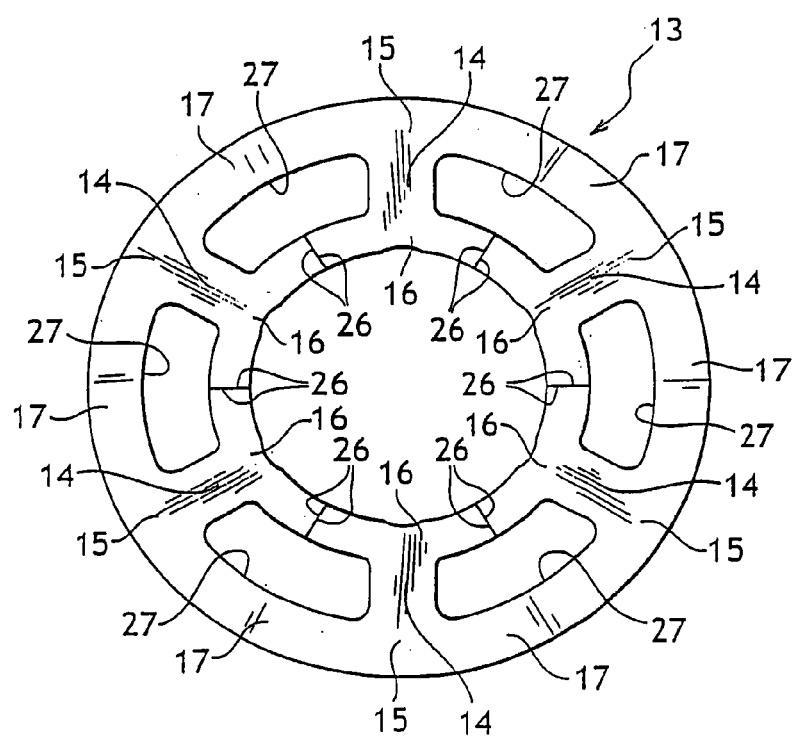
FIG. 2 is an elevation view of the washer while its teeth are extending in a radial plane.
Figure 3:
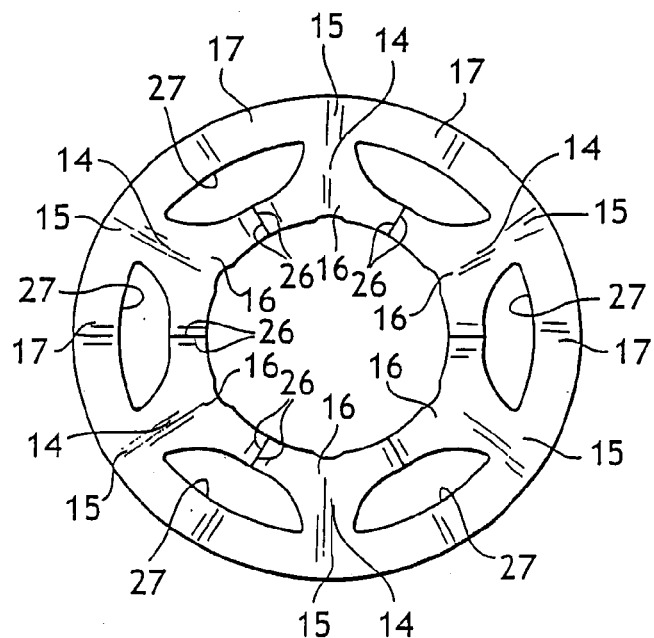
FIGS. 3 and 4 are views analogous to FIG. 2 showing variant embodiments of washers.
Figure 4:
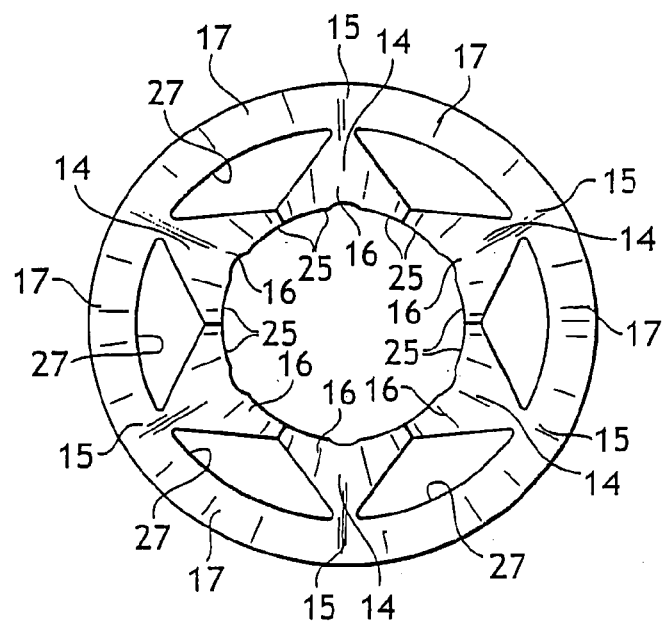

The teeth of the washer may have shapes other than the T-shape shown in FIGS. 1 and 2. Thus, the teeth may be more triangular in shape, as shown in FIG. 4, or they may be of an intermediate shape as shown in FIG. 3.

Figure 5:
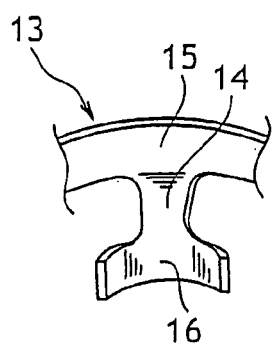
FIGS. 5 and 6 are fragmentary perspective views showing variant embodiments of the active portions of teeth of the washer.
Figure 6:
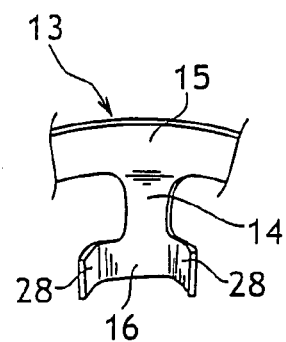

In a variant, the method includes a step of deforming the active portions so as to form at least one portion that projects relative to the general plane of a tooth. The active portions may then be curved in shape about a radius of the washer (see FIG. 5) or they may include side rims 28 projecting from the mean plane of the active portion 16 (see FIG. 6). This makes it possible to prevent the washer from turning relative to the tube, thereby preventing extraction of the tube by unscrewing.

What is claimed is:

1. A tube coupler device comprising a body having a bore for receiving the end of a tube and means for retaining the tube in the bore, said means being constituted by an elastically-deformable washer comprising an outer portion placed in a groove formed in the bore, the groove having a sloping downstream wall, and an inner portion subdivided into a plurality of teeth, each possessing a short root portion extending at rest in a radial plane, and an active portion inclined relative to the radial plane, which teeth are interconnected by peripheral connection portions such that the deformation of the peripheral connection portions that results from the washer as a whole being deformed is greater than the deformation of the teeth, the device including an abutment for the teeth when an excessive extraction force is applied to the tube, each tooth being capable of rocking about the abutment, the peripheral portion of the washer then coming to bear against the sloping wall of the groove so that after the active portions of the teeth have rocked about the abutment, their side edges are immediately adjacent to one another in pairs.

2. A device according to claim 1, including a tubular pusher mounted to slide in the bore between an inactive extended first position and an active inserted second position in which the teeth of the washer are moved away from their rest position by a nose of the pusher, with the nose of the pusher in its inactive position constituting the abutment for the teeth.

3. A device according to claim 2, wherein, after the teeth have rocked against the abutment, the washer is in a second stable shape in which the root of each tooth is inclined while the active portion of each tooth is contained in a plane that is substantially radial.

* * * * *